US008651875B2

(12) United States Patent
Ferguson et al.

(10) Patent No.: US 8,651,875 B2
(45) Date of Patent: Feb. 18, 2014

(54) ELECTROMECHANICAL PAWL FOR CONTROLLING VEHICLE CHARGE INLET ACCESS

(75) Inventors: Joshua Willard Ferguson, Alameda, CA (US); Andrew David Baglino, San Francisco, CA (US); Nicholas Robert Kalayjian, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/589,098

(22) Filed: Aug. 18, 2012

(65) Prior Publication Data

US 2013/0078841 A1    Mar. 28, 2013

Related U.S. Application Data

(63) Continuation-in-part of application No. 29/497,056, filed on Jul. 13, 2012, and a continuation-in-part of application No. 29/427,078, filed on Jul. 13, 2012, and a continuation-in-part of application No. 13/549,185, filed on Jul. 13, 2012, which is a continuation-in-part of application No. 13/482,900, filed on May 29, 2012, and a continuation-in-part of application No. 13/489,617, filed on Jun. 6, 2012, now Pat. No. 8,539,990.

(60) Provisional application No. 61/540,303, filed on Sep. 28, 2011, provisional application No. 61/540,441, filed on Sep. 28, 2011, provisional application No. 61/540,549, filed on Sep. 29, 2011, provisional application No. 61/540,550, filed on Sep. 29, 2011, provisional application No. 61/654,779, filed on Jun. 1, 2012.

(51) Int. Cl.
*H01R 12/00* (2006.01)

(52) U.S. Cl.
USPC .............................................. 439/34; 439/372

(58) Field of Classification Search
USPC ............ 320/109, 107, 108, 111, 162; 439/34, 439/372
See application file for complete search history.

(56) References Cited

U.S. PATENT DOCUMENTS

| 5,536,173 | A | * | 7/1996 | Fujitani et al. | 439/34 |
| 5,556,284 | A | * | 9/1996 | Itou et al. | 439/34 |
| 5,577,920 | A | * | 11/1996 | Itou et al. | 439/34 |
| 2013/0078839 | A1 | * | 3/2013 | Musk et al. | 439/345 |
| 2013/0078841 | A1 | * | 3/2013 | Ferguson et al. | 439/350 |

\* cited by examiner

*Primary Examiner* — James Harvey
(74) *Attorney, Agent, or Firm* — J. Richard Soderberg

(57) ABSTRACT

A charge connector latching mechanism integrated into a vehicle's charge inlet is provided, where the latching mechanism includes a retractable latching pawl. The retractable pawl is configured to be positioned in at least a first, default position where the pawl extends through an inlet surface of the charge inlet, and a second position where the pawl is retracted and does not extend through the inlet surface. In the first position the retractable pawl prevents insertion of a charge connector into the charge inlet if the charge connector is uncoupled from the inlet, and prevents removal of the charge connector if the charge connector is coupled to the inlet. In the second position the retractable pawl allows insertion/withdrawal of the charge connector into/from the charge inlet. The front surface of the retractable pawl may include a nub configured to fit within a recess within the front face of the charge connector.

17 Claims, 7 Drawing Sheets

ELECTROMECHANICAL PAWL FOR CONTROLLING VEHICLE CHARGE INLET ACCESS

CROSS-REFERENCE TO RELATED APPLICATION

This application is a continuation-in-part of U.S. patent application Ser. No. 29/427,056, filed 13 Jul. 2012, Ser. No. 29/427,078, filed 13 Jul. 2012, and Ser. No. 13/549,185, filed 13 Jul. 2012, the disclosures of which are incorporated herein by reference for any and all purposes. U.S. patent application Ser. No. 13/549,185, filed 13 Jul. 2012, is a continuation-in-part of U.S. patent application Ser. No. 13/482,900, filed 29 May 2012 and Ser. No. 13/489,617, filed 6 Jun. 2012, and claims the benefit of the filing date of U.S. Provisional Patent Application Ser. Nos. 61/540,303, filed 28 Sep. 2011, 61/540,441, filed 28 Sep. 2011, 61/540,549, filed 29 Sep. 2011, 61/540,550, filed 29 Sep. 2011, and 61/654,779, filed 1 Jun. 2012, the disclosures of which are incorporated herein by reference for any and all purposes.

FIELD OF THE INVENTION

The present invention relates generally to vehicles and, more particularly, to means for controlling access to the charge port of an electric vehicle.

BACKGROUND OF THE INVENTION

The charge port for plug-in hybrids (PHEVs) and all-electric vehicles (EVs) is typically externally mounted, thereby allowing easy access and the ability to lock the passenger compartment while the vehicle is being charged. A charge port door, similar to the fuel filler door on a conventional vehicle, is used to protect the charge inlet from the weather as well as possible tampering.

In a typical charge coupler scenario, after opening the charge port door the user aligns the charge connector, which is connected to a charging source, with the charge inlet. Once aligned, the user is able to freely insert the charge connector into the charge inlet. After connector insertion, a latching mechanism mechanically couples the charge connector to the charge port assembly, thus insuring that the connector will remain in place until charging is terminated. The latching mechanism, in combination with the sensing contacts integrated into the inlet/connector, protect the user from accidentally or unknowingly removing the connector while the connection is energized. The latching mechanism of a conventional coupler may also be used to reduce the mechanical load applied to the electrical contacts.

The present invention provides an alternate latching mechanism that achieves additional functionality over that of a conventional latching mechanism.

SUMMARY OF THE INVENTION

The present invention provides a charge connector latching mechanism integrated into an electric vehicle's charge inlet, where the connector latching mechanism includes a retractable latching pawl. The retractable pawl may be fabricated from anodized aluminum. The retractable pawl is configured to be positioned in at least a first, default position (e.g., pre-charging condition) where the pawl extends through an inlet surface of the charge inlet, and a second position where the pawl is retracted and does not extend through the inlet surface. In the first position the retractable pawl prevents insertion of a charge connector into the charge inlet if the charge connector is uncoupled from the inlet, and prevents removal of the charge connector if the charge connector is coupled to the inlet. In the second position the retractable pawl is retracted and thus allows insertion of the charge connector into the charge inlet, or withdrawal of the charge connector from the charge inlet. The front surface of the retractable pawl may include a nub, the nub extending from the front surface of the pawl and configured to fit within a recess within the front face of the charge connector, thus causing the retractable pawl to track the motion (e.g., rocking motion) of the charge connector when the nub is within the charge connector's recess.

The latching mechanism may include a lever assembly and a spring, where the retractable pawl is mechanically coupled to the lever assembly and the spring maintains the pawl, via the lever assembly, in the first position (e.g., the default position).

The latching mechanism may include a lever assembly and a solenoid actuator, where the retractable pawl is mechanically coupled to the lever assembly and the solenoid actuator controls movement of the retractable pawl from the first position to the second position via the lever assembly. In this configuration, the latching mechanism may further include a spring coupled to the retractable pawl via the lever assembly, where the spring maintains the pawl in the first position when the solenoid actuator is un-energized. The latching mechanism may further include a controller coupled to the solenoid actuator that controls when the solenoid actuator is energized. The controller may be configured to perform a set of pre-connection diagnostics before energizing the solenoid actuator and allowing insertion of the charge connector into the vehicle's charge inlet. The controller may be configured to perform a set of pre-de-coupling diagnostics before energizing the solenoid actuator and allowing withdrawal of the charge connector from the vehicle's charge inlet. The controller may be configured to determine if the vehicle's battery is electrically connected to the charge inlet's power connectors and only energize the solenoid actuator when the power connectors are not electrically connected to the vehicle's battery.

The charge inlet is comprised of a plurality of electrical contacts configured to be electrically coupled to a second plurality of electrical contacts integrated into the charge connector. The charge inlet is further comprised of an inlet housing having an inlet surface, a first end and a second end, where the first end is closed by a bottom surface into which the plurality of electrical contacts are integrated and the second end is open and sized to accept a charge connector. The plurality of electrical contacts may include first and second power contacts, a ground contact, a pilot contact and a proximity sense contact. The perimeter of the inlet surface may be curvilinear and non-cylindrical, where a second perimeter corresponding to the charge connector is complementary to the perimeter of the inlet surface and sized to allow insertion of the charge connector into the inlet housing, and where the perimeter of the inlet surface and the second perimeter corresponding to the charge connector permit only a single orientation of the charge connector during insertion of the charge connector into the charge inlet, where the single orientation aligns the charge connector to the charge inlet and aligns the plurality of electrical contacts to the second plurality of electrical contacts. The shape of the perimeter of the inlet surface may approximate a trapezoidal shape.

The charge inlet may further be comprised of a divider extending from the bottom surface and configured to fit within a complementary slot of the charge connector, where the divider is fabricated from an electrically insulating material and is separate from the plurality of electrical contacts. The divider may utilize a three pointed star shape, for example where a first portion extends between the first and second power contacts, where a second portion extends between the first power contact and the pilot contact, and where a third portion extends between the second power contact and the proximity sense contact.

A further understanding of the nature and advantages of the present invention may be realized by reference to the remaining portions of the specification and the drawings.

DESCRIPTION OF THE SPECIFIC EMBODIMENTS

Figure 1:
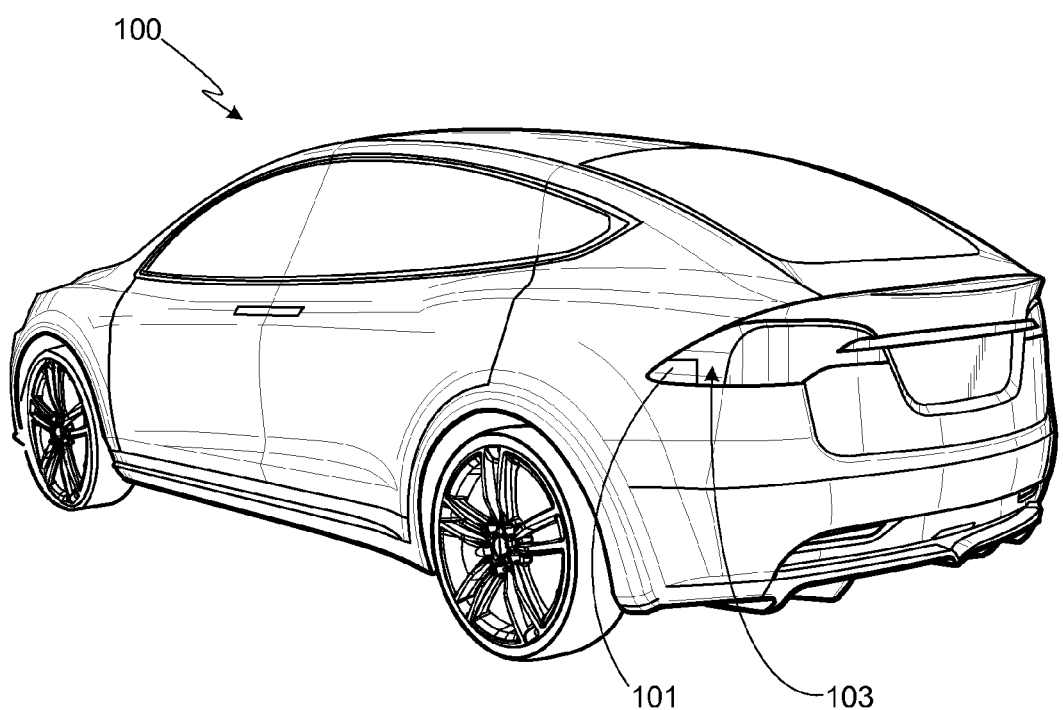
FIG. 1 illustrates a charge port integrated into the lamp assembly of an electric vehicle.
Figure 2:
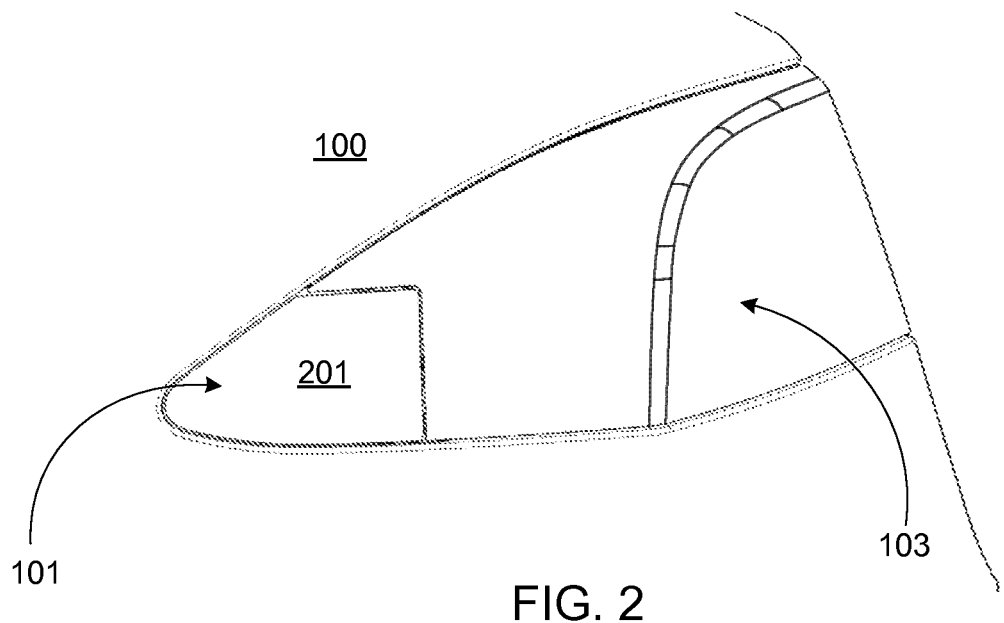
FIG. 2 provides an external side view of the lamp assembly of the vehicle shown in FIG. 1 with the charge port access door closed.
Figure 3:
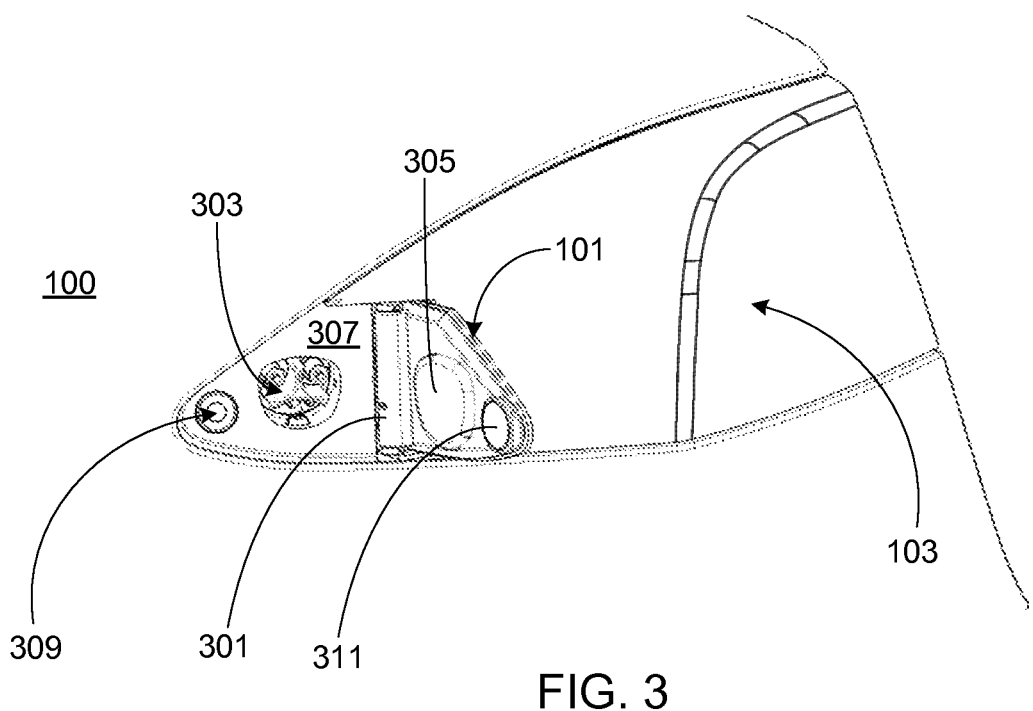
FIG. 3 provides an external side view of the lamp assembly of the vehicle shown in FIG. 1 with the charge port access door open.

FIGS. 1-3 illustrate a charge port door 101 integrated within the rear vehicle lamp and reflector assembly 103 of a vehicle 100. It should be understood, however, that the present invention is not limited to such a configuration and that a charge inlet in accordance with the invention may be mounted at another vehicle location, such as the front or rear fender panel, or another vehicle body member.

FIGS. 2 and 3 provide external side views of the lamp assembly 103 of vehicle 100 and charge port door 101 with the door closed and opened, respectively. In this exemplary configuration, the exterior surface of charge port door 101 is covered with a reflector 201, thus allowing the charge port door to blend into the lamp and reflector assembly 103. Door 101 is preferably spring loaded, thus causing the door to at least partially open about hinge axis 301 when the port door latching mechanism is released. With door 101 open, charge inlet 303 is visible as is port seal 305. Inlet 303 is recessed within a trim cover 307 of the port assembly. In this exemplary embodiment, a portion 309 of an electromagnetic port door latching mechanism is located within the charge port assembly integrated into the vehicle while a secondary portion 311 of the latching mechanism is located on the complementary surface of door 101. A suitable electromagnetic latching mechanism is described in detail in co-pending and co-assigned U.S. patent application Ser. No. 13/482,900, filed 29 May 2012, the disclosure of which is incorporated herein for any and all purposes. It should be understood, however, that the charge inlet of the present invention is not limited to use with a charge port and door latching assembly of any particular configuration. For example, the door covering the inlet may be configured as a spring loaded door with a simple door handle or finger hold, a push-push latch, a solenoid latching assembly, a spring loaded latch operated using a cable, or any other latching assembly.

Figure 4:
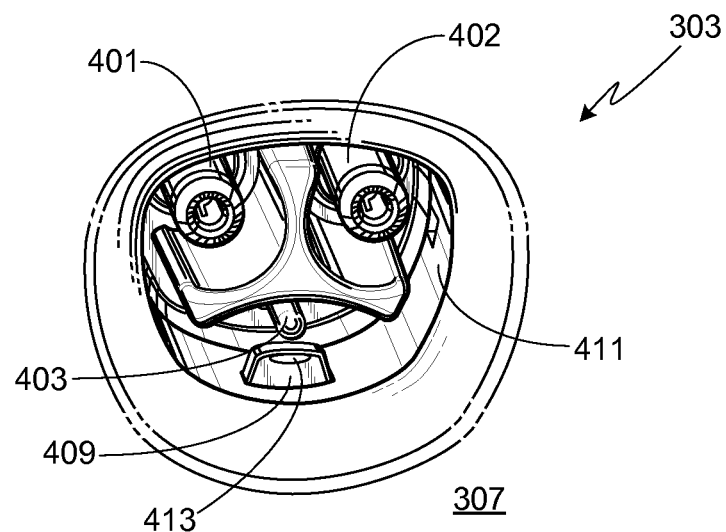
FIG. 4 provides a perspective view of a charge inlet in accordance with the invention.
Figure 5:
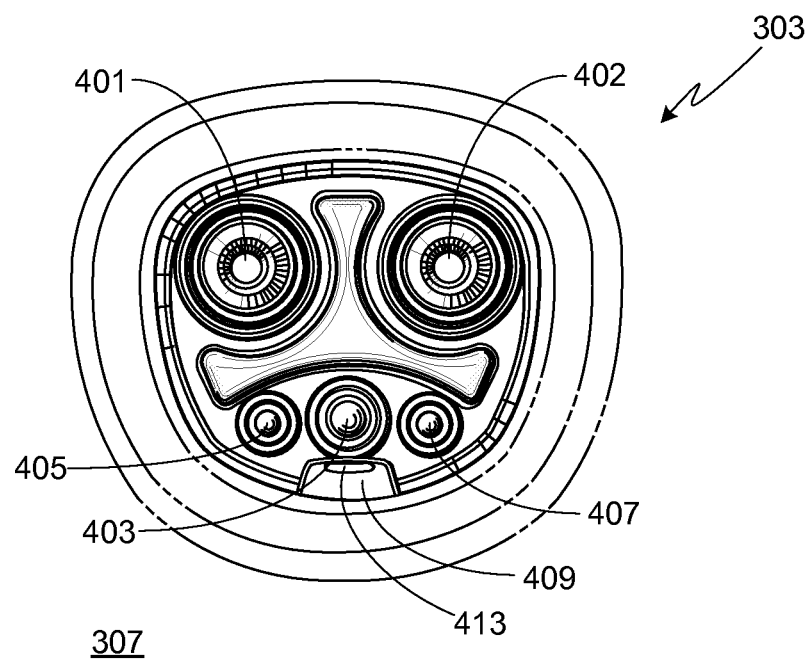
FIG. 5 provides an outer view of the charge inlet shown in FIG. 4.
Figure 6:
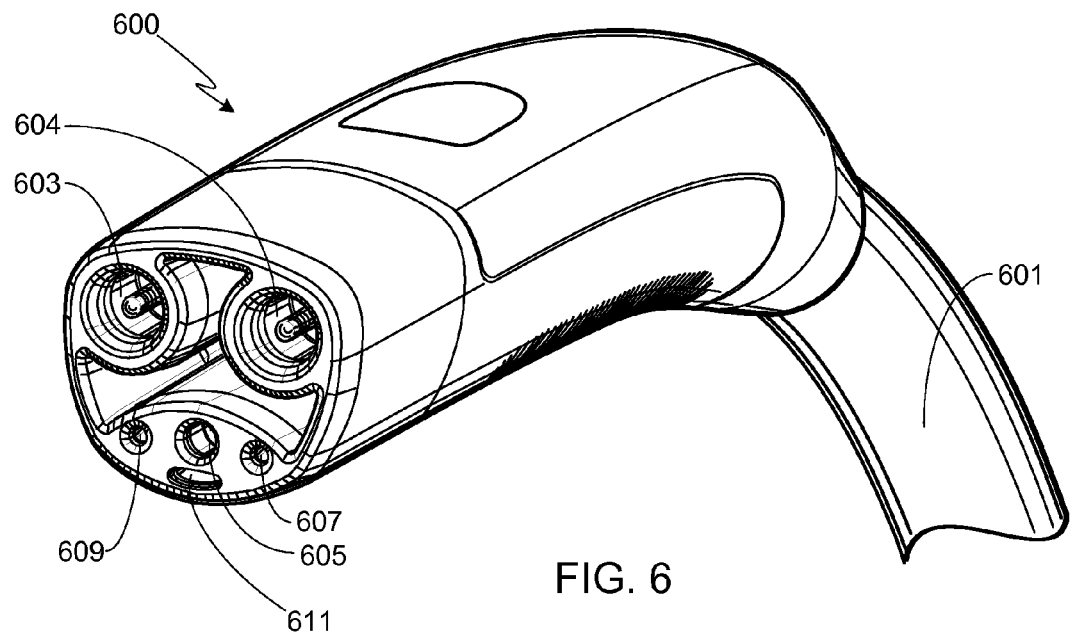
FIG. 6 provides a perspective view of a charge connector for use with the charge inlet shown in FIGS. 4 and 5.
Figure 7:
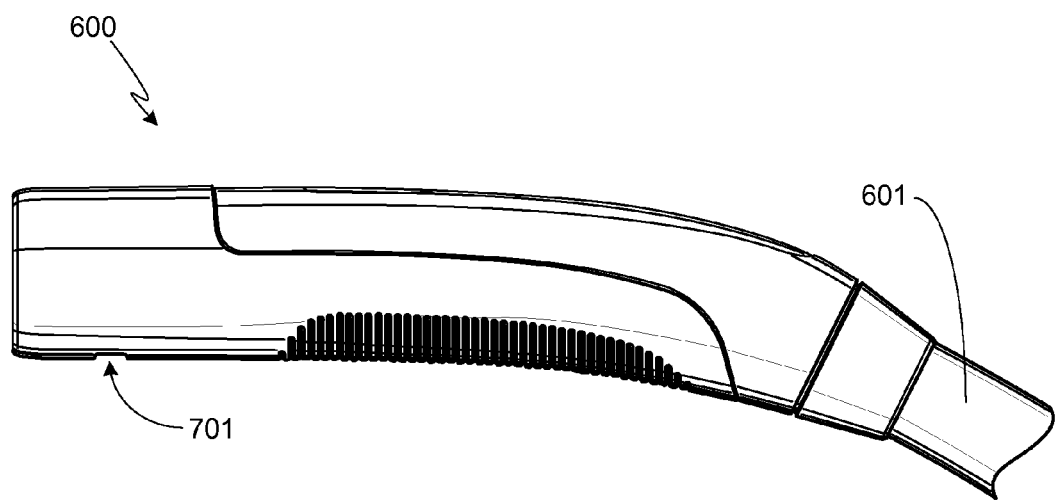
FIG. 7 provides a side view of the charge connector shown in FIG. 6.
Figure 8:
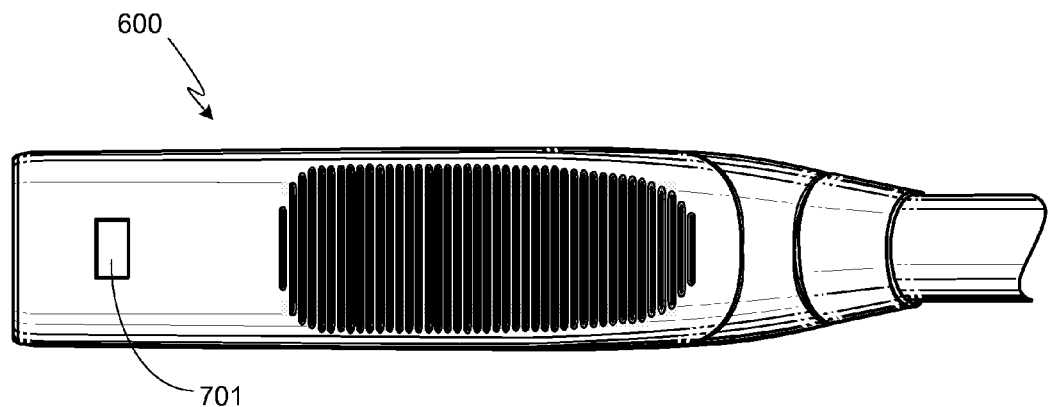
FIG. 8 provides a bottom view of the charge connector shown in FIGS. 6 and 7.

FIGS. 4 and 5 provide multiple views of charge inlet 303, also referred to herein as a charge port. Charge inlet 303 is coupled to the charging system, not shown, of vehicle 100. FIGS. 6-8 provide perspective, side and bottom views, respectively, for a connector 600 suitable for use with charge inlet 303, connector 600 coupled to a charging source, not shown, via cable 601. It should be understood that the invention, described in detail below, may be used with alternate inlet/connector geometries than those shown herein. Additionally, the latching pawl of the present invention may be used with inlet/connector contacts and contact patterns different from those illustrated and described herein.

The exemplary charge inlet 303 includes a pair of power contacts 401 and 402, a ground contact 403, a control pilot contact 405 and a proximity sense contact 407. Connector 600 includes complementary power contacts 603 and 604, ground contact 605, control pilot contact 607 and proximity sense contact 609. The control pilot conductor is the communication link between the vehicle and the charging system that insures that prior to initiating charging, the vehicle is connected, the source is ready to supply charging energy, and the vehicle is ready to accept charging energy. This communication link is also used to determine ventilation requirements, current battery capacity, and to control energy flow throughout the process while monitoring the ground connection. The proximity sense conductor allows the vehicle to detect the presence of the charge connector so that vehicle movement may be prevented when the car is coupled to the charge system. Note that although pin and socket type contacts are shown, other contact types may be used with the invention such as blade terminals, rod terminals, and terminal pads.

Figure 9:
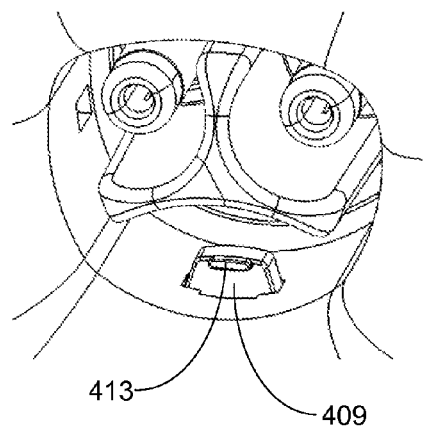
FIG. 9 provides a view of the charge inlet shown in FIGS. 4 and 5 with the latching pawl in the extended position.
Figure 10:
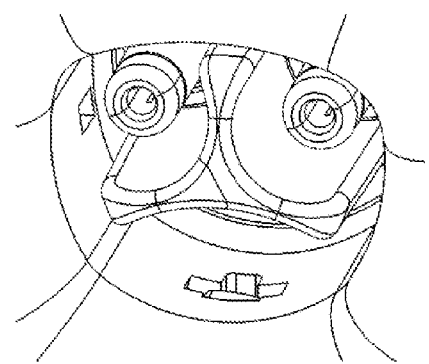
FIG. 10 provides a view of the charge inlet shown in FIGS. 4 and 5 with the latching pawl in the retracted position.

Also visible in FIGS. 4 and 5 is a retractable latching pawl 409. Latching pawl 409 is configured to serve dual purposes. First, latching pawl 409 prevents charge connector 600 from being inserted into inlet 303 until the vehicle's charge controller authorizes coupling the charge inlet to a charging source. Second, latching pawl 409 holds connector 600 in place, specifically by engaging within aperture 701 of the connector 600 once the connector 600 is fully inserted into the charge inlet, until the vehicle's charge controller authorizes de-coupling the charge inlet from a charging source. FIGS. 9 and 10 illustrate latching pawl 409 in the extended and retracted positions, respectively.

Figure 11:
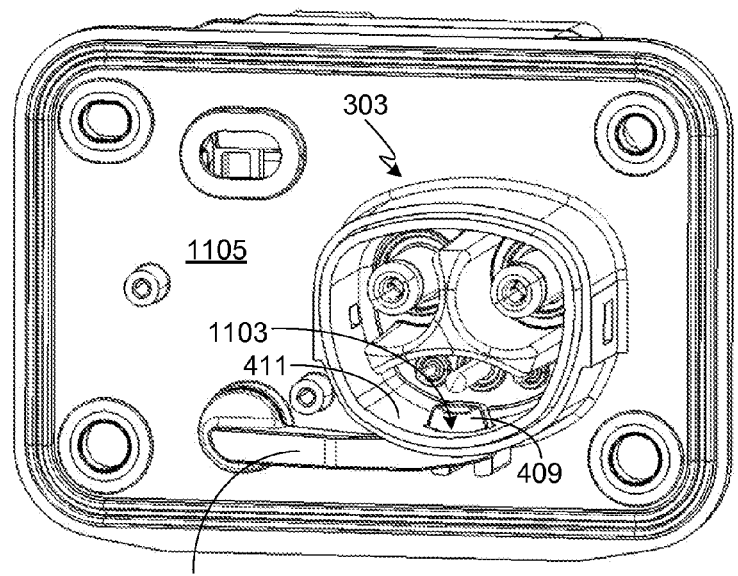
FIG. 11 provides a first perspective view of the charge inlet shown in FIGS. 4 and 5 with the trim cover removed.
Figure 12:
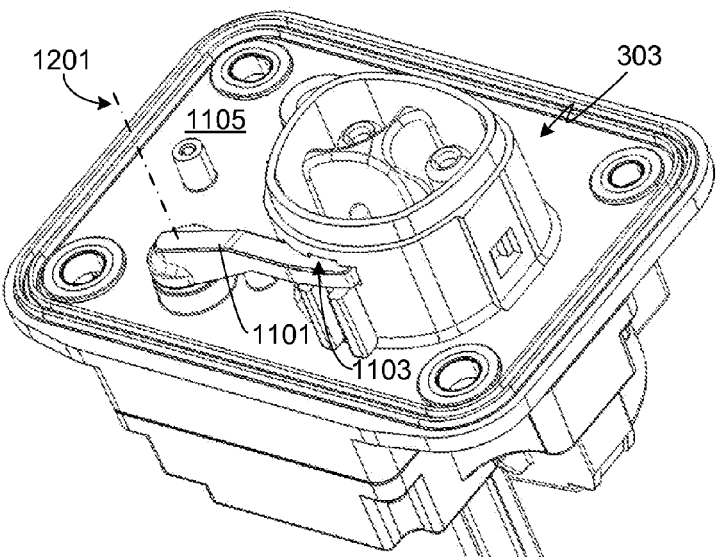
FIG. 12 provides an alternate perspective view of the charge inlet shown in FIGS. 4 and 5 with the trim cover removed.

FIGS. 11 and 12 provide alternate front, perspective views of charge inlet 303 with the trim cover 307 removed, thus providing a clear view of latching pawl 409. In the illustrated embodiment, latching pawl 409 is the end portion of a lever member 1101, the two preferably being fabricated from a metal, such as anodized aluminum, and as a single piece.

Lever 1101 rotates about axis 1201, thus allowing controlled movement of pawl 409 in and out of charge inlet housing slot 1103.

Figure 13:
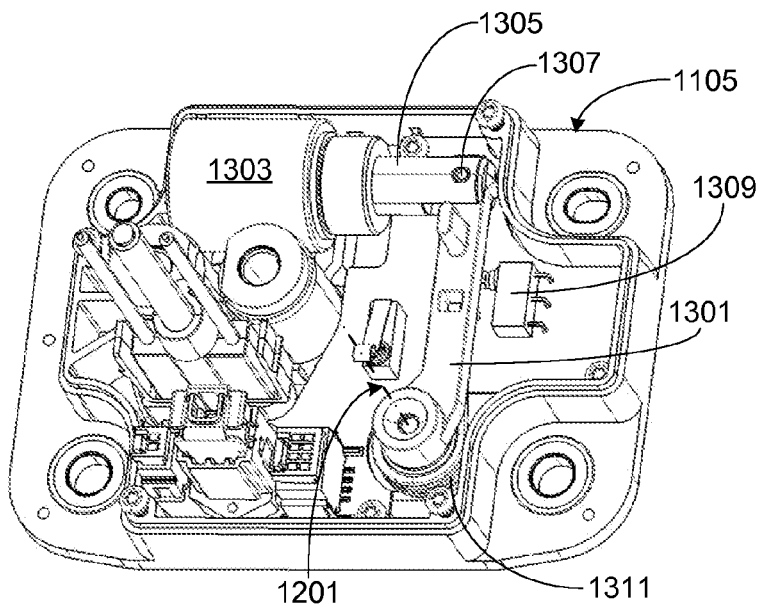
FIG. 13 provides a rear, perspective view of a portion of the charge inlet assembly shown in FIGS. 4 and 5, this view illustrating the primary components associated with the latching pawl.

FIG. 13 provides a rear, perspective view of a portion of the charge inlet assembly, this view illustrating the primary components associated with latching pawl 409. As shown, a second lever member 1301, located behind charge inlet baseplate 1105, is rigidly coupled to the first lever member 1101 by an axial member (e.g., a threaded fastener), not visible, along axis 1201. The distal end portion of lever 1301 is coupled to a solenoid actuator 1303. In particular, lever 1301 is coupled to plunger 1305 of solenoid actuator 1303 via pin 1307, pin 1307 allowing lever 1301 to pivot relative to plunger 1305. In the preferred embodiment of the invention, switch 1309 provides feedback to the latching controller as to the position of levers 1301 and 1101, and thus the position of pawl 409, relative to the charge inlet housing.

Figure 14:
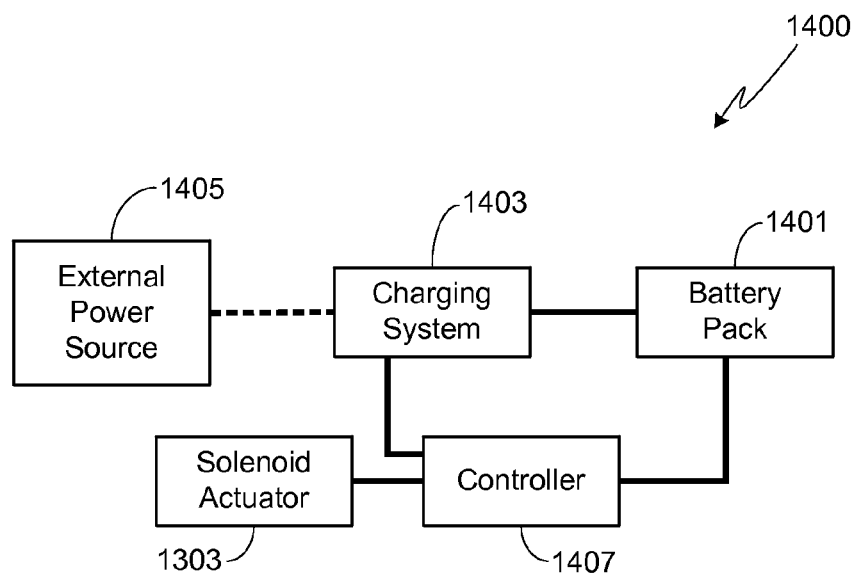
FIG. 14 illustrates the primary system components associated with the electromechanical charge inlet pawl.

FIG. 14 illustrates the integration of the latching mechanism, and in particular the latching solenoid actuator 1303, into vehicle system 1400. As shown, battery pack 1401 is coupled to a charging system 1403. Battery pack 1401 includes at least one, and typically hundreds or thousands of rechargeable cells. It will be appreciated that the invention is not limited to use with a particular vehicle type (e.g., may be used with an all-electric vehicle, a plug-in hybrid vehicle, etc.) nor is the invention limited to a particular type of battery or battery pack configuration. Rather, the electromechanical pawl of the present invention may be used to control access to the charge inlet of any suitable vehicle utilizing any type of rechargeable battery (e.g., metal-air cells, lithium ion cells such as lithium iron phosphate, lithium cobalt oxide, other lithium metal oxides, lithium ion polymer cells, nickel metal hydride cells, nickel cadmium cells, nickel hydrogen cells, nickel zinc cells, silver zinc cells, etc.).

Charging system 1403 may be integrated within the electric vehicle, integrated within the charging station, or configured as a stand-alone charger that is coupled between the external power source 1405 (e.g., the power grid) and the vehicle's battery pack 1401. During charging, the external power source 1405 is coupled to the charging system 1403 and battery pack 1401 via a connector such as connector 600, and a charge inlet such as charge inlet 303, both described above.

Battery pack charging is controlled by a controller 1407, which may be a stand-alone controller or, as preferred, integrated into the vehicle's control system. Controller 1407 monitors and controls the various aspects of battery charging, e.g., charging rate, current state-of-charge (SOC) and desired SOC, battery pack temperature, etc. Additionally and in accordance with the invention, controller 1407 controls access to the charge inlet, e.g., inlet 303, by controlling the position of latching pawl 409.

During normal vehicle operation, solenoid actuator 1303 is unpowered, i.e., un-energized. When solenoid actuator 1303 is un-energized, preferably a spring 1311 maintains pawl 409 in the extended position as illustrated in FIG. 9. Spring 1311 is preferably a coil spring as shown, although other types of springs may be used to hold pawl 409 in place. Alternately, solenoid actuator 1303 may be a magnetic latching solenoid, also commonly referred to as a bi-stable solenoid, thus providing a means for maintaining pawl 409 in the extended position even when the solenoid is un-energized. In the extended position, insertion of a connector (e.g., connector 600) into the charge inlet is prevented.

When solenoid actuator 1303 is un-energized, only spring 1311 insures that pawl 409 remains in the extended, connector blocking position. Even though in this position pawl 409 prevents direction insertion of a charge connector into the charge port, the inventors have found that in some instances it is possible to force the pawl into a sufficiently retracted position to allow insertion of the charge connector, for example by rocking the charge connector up and down in a ratcheting motion. Accordingly, in the preferred and illustrated embodiment, pawl 409 is fabricated with a small nub 413 extending from the face of the pawl. Nub 409 is configured to fit within a recess 611 located on the end face of the corresponding charge connector, e.g., connector 600. When the connector is first inserted into the charge inlet, assuming that pawl 409 is in the extended position, nub 413 fits within recess 611. As a result, if connector 600 is rocked up and down, pawl 409 tracks this motion thereby preventing pawl 409 from being ratcheted down.

In accordance with the invention, prior to energizing solenoid actuator 1303 and retracting pawl 409, controller 1407 performs a set of pre-connection diagnostics that are intended to insure that it is safe to connect the charge connector to the charge inlet. For example, during pre-connection diagnostics controller 1407 checks that the battery is not electrically connected to power contacts 401 and 402. Once it is verified that the charge connector may be connected to the charge inlet, controller 1407 energizes solenoid actuator 1303. When actuator 1303 is energized, plunger 1305 retracts causing lever members 1301 and 1101 to rotate about axis 1201. This motion, in turn, causes pawl 409 to retract below the inner surface of charge inlet housing 411, thereby allowing connector 600 to be inserted into charge inlet 303. Once controller 1407 determines that connector 600 is inserted into the charge inlet, solenoid actuator 1303 is de-energized and spring 1311 once again forces pawl 409 into the extended position. In this position, pawl 409 extends through complementary aperture 701 of connecter 600, thereby locking the charge connector into the charge inlet and preventing it from accidentally being withdrawn while the charging connectors are energized. After charging is complete and controller 1407 determines via a set of pre-de-coupling diagnostics that it is safe to remove connector 600 from the charge inlet, solenoid actuator 1303 is temporarily energized, thus retracting pawl 409 and allowing withdrawal of the charge connector.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A vehicle charge inlet integrated within a vehicle, the vehicle charge inlet comprising:

a plurality of electrical contacts configured to be electrically coupled to a second plurality of electrical contacts integrated into a charge connector;

an inlet housing having an inlet surface, a first end and a second end, wherein said first end is closed by a bottom surface and said second end is open and sized to accept said charge connector, wherein said plurality of electrical contacts are integrated into said bottom surface of said inlet housing; and a connector latching mechanism integrated within said inlet housing, said connector latching mechanism further comprising:

a retractable pawl, wherein said retractable pawl is configured to be positioned in at least a first position and a second position, wherein said first position corresponds to an extended position wherein said retractable pawl extends through said inlet surface, wherein said second position corresponds to a retracted position wherein said retractable pawl does not extend through said inlet surface, wherein said retractable pawl in said first position prevents insertion of said charge connector if said charge connector is uncoupled from said vehicle charge inlet, wherein said retractable pawl in said first position fits within a slot in said charge connector and prevents removal of said charge connector if said charge connector is coupled to said vehicle charge inlet, wherein said retractable pawl in said second position allows insertion and withdrawal of said charge connector into and from said vehicle charge inlet, wherein said first position is a default position for said retractable pawl, and wherein said default position corresponds to a precharging condition for said vehicle and corresponds to a normal operational, non-charging condition for said vehicle.

2. The vehicle charge inlet of claim 1, said retractable pawl further comprising a nub extending from a front surface of said retractable pawl, said nub configured to fit within a recess within a front face of said charge connector during insertion of said charge connector into said vehicle charge inlet when said retractable pawl is in said first position, wherein a rocking motion of said charge connector when said nub is within said recess causes said retractable pawl to track said rocking motion.

3. The vehicle charge inlet of claim 1, said connector latching mechanism further comprising a lever assembly and a spring, wherein said retractable pawl is mechanically coupled to said lever assembly, and wherein said spring maintains said retractable pawl via said lever assembly in said first position.

4. The vehicle charge inlet of claim 1, said connector latching mechanism further comprising a lever assembly and a solenoid actuator, wherein said retractable pawl is mechanically coupled to said lever assembly, and wherein said solenoid actuator controls movement of said retractable pawl from said first position to said second position via said lever assembly.

5. The vehicle charge inlet of claim 4, said connector latching mechanism further comprising a spring coupled to said retractable pawl via said lever assembly, wherein when said solenoid actuator is un-energized said spring maintains said retractable pawl in said first position, and wherein when said solenoid actuator is energized said solenoid actuator repositions said retractable pawl from said first position to said second position.

6. The vehicle charge inlet of claim 5, said lever assembly further comprising a first lever member and a second lever member, wherein a first end portion of said first lever member is comprised of said retractable pawl, wherein said first lever member rotates about a first axis, wherein said second lever member is mechanically coupled to said first lever member and rotates about said first axis, wherein rotation of said second lever member causes rotation of said first lever member, and wherein said solenoid actuator is coupled to said second lever member.

7. The vehicle charge inlet of claim 1, said connector latching mechanism further comprising:

a lever assembly, wherein said retractable pawl is mechanically coupled to said lever assembly;

a spring, wherein said spring maintains said retractable pawl via said lever assembly in said first position;

a solenoid actuator coupled to said retractable pawl via said lever assembly; and a controller coupled to said solenoid actuator, wherein said controller controls when said solenoid actuator is energized, wherein when said solenoid actuator is un-energized said spring maintains said retractable pawl in said first position, and wherein when said solenoid actuator is energized said solenoid actuator repositions said retractable pawl from said first position to said second position.

8. The vehicle charge inlet of claim 7, wherein said controller is configured to perform a set of pre-connection diagnostics before said controller energizes said solenoid actuator to allow insertion of said charge connector into said vehicle charge inlet.

9. The vehicle charge inlet of claim 7, wherein said controller is configured to perform a set of pre-de-coupling diagnostics before said controller energizes said solenoid actuator to allow withdrawal of said charge connector from said vehicle charge inlet.

10. The vehicle charge inlet of claim 7, wherein said controller is configured to determine if a vehicle battery is electrically connected to a pair of power connectors of said plurality of electrical contacts, wherein said controller is further configured to only energize said solenoid actuator if said pair of power connectors are not electrically connected to said vehicle battery.

11. The vehicle charge inlet of claim 1, wherein said retractable pawl is fabricated from anodized aluminum.

12. The vehicle charge inlet of claim 1, said plurality of electrical contacts comprising a first power contact, a second power contact, a ground contact, a pilot contact, and a proximity sense contact.

13. The vehicle charge inlet of claim 1, wherein a perimeter of said inlet surface is curvilinear and non-cylindrical, wherein a second perimeter corresponding to said charge connector is complementary to said perimeter of said inlet surface and sized to allow insertion of said charge connector into said inlet housing, and wherein said perimeter of said inlet surface and said second perimeter of said charge connector permit only a single orientation of said charge connector upon insertion of said charge connector into said vehicle charge inlet, wherein said single orientation aligns said charge connector to said vehicle charge inlet and aligns said plurality of electrical contacts to said second plurality of electrical contacts.

14. The vehicle charge inlet of claim 13, wherein a shape corresponding to said perimeter of said inlet surface approximates a trapezoidal shape.

15. The vehicle charge inlet of claim 1, further comprising a divider extending from said bottom surface and configured to fit within a complementary slot of said charge connector, said divider fabricated from an electrically insulating material, wherein said divider is separate from said plurality of electrical contacts.

16. The vehicle charge inlet of claim 15, wherein said divider has a three pointed star shape.

17. The vehicle charge inlet of claim 15, said plurality of electrical contacts comprising a first power contact, a second power contact, a ground contact, a pilot contact, and a proximity sense contact, wherein a first portion of said divider extends between said first and second power contacts, wherein a second portion of said divider extends between said first power contact and said pilot contact, and wherein a third portion of said divider extends between said second power contact and said proximity sense contact.

\* \* \* \* \*